(12) United States Patent
Ahmed et al.

(10) Patent No.: US 7,563,292 B2
(45) Date of Patent: Jul. 21, 2009

(54) FUEL PROCESSOR AND METHOD FOR GENERATING HYDROGEN FOR FUEL CELLS

(75) Inventors: Shabbir Ahmed, Naperville, IL (US); Sheldon H. D. Lee, Willowbrook, IL (US); John David Carter, Bolingbrook, IL (US); Michael Krumpelt, Naperville, IL (US); Deborah J. Myers, Lisle, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1078 days.

(21) Appl. No.: 10/789,219

(22) Filed: Feb. 27, 2004

(65) Prior Publication Data

US 2004/0163311 A1 Aug. 26, 2004

Related U.S. Application Data

(62) Division of application No. 09/816,676, filed on Mar. 23, 2001, now Pat. No. 6,713,040.

(51) Int. Cl.
 *B01J 7/00* (2006.01)
(52) U.S. Cl. .................. 48/61; 48/197 R; 48/198.7; 422/171
(58) Field of Classification Search ............. 422/171; 48/61, 197 R, 198.7; 423/650, 651, 652, 423/653, 654
See application file for complete search history.

(56) References Cited

U.S. PATENT DOCUMENTS 5,066,421 A 11/1991 Giacobbe (Continued)

FOREIGN PATENT DOCUMENTS

EP 0 600 621 A1 11/1993

(Continued)

OTHER PUBLICATIONS

S. Ahmed, et al., "Integrated Fuel Processor Development," presented at Annual National Laboratory R&D Meeting of the DOE Fuel Cells for Transportation Program, Jun. 23-25, 1999, Argonne, IL.

(Continued)

*Primary Examiner*—Wayne Langel
(74) *Attorney, Agent, or Firm*—Foley & Lardner LLP

(57) ABSTRACT

A method of producing a $H_2$ rich gas stream includes supplying an $O_2$ rich gas, steam, and fuel to an inner reforming zone of a fuel processor that includes a partial oxidation catalyst and a steam reforming catalyst or a combined partial oxidation and stream reforming catalyst. The method also includes contacting the $O_2$ rich gas, steam, and fuel with the partial oxidation catalyst and the steam reforming catalyst or the combined partial oxidation and stream reforming catalyst in the inner reforming zone to generate a hot reformate stream. The method still further includes cooling the hot reformate stream in a cooling zone to produce a cooled reformate stream. Additionally, the method includes removing sulfur-containing compounds from the cooled reformate stream by contacting the cooled reformate stream with a sulfur removal agent. The method still further includes contacting the cooled reformate stream with a catalyst that converts water and carbon monoxide to carbon dioxide and $H_2$ in a water-gas-shift zone to produce a final reformate stream in the fuel processor.

19 Claims, 5 Drawing Sheets

U.S. PATENT DOCUMENTS

| | | | |
|---|---|---|---|
| 5,112,527 | A | 5/1992 | Kobylinski |
| 5,167,933 | A | 12/1992 | Norsk |
| 5,248,566 | A | 9/1993 | Kumar et al. |
| 5,458,857 | A | 10/1995 | Collins et al. |
| 5,752,995 | A | 5/1998 | Kang |
| 5,861,137 | A | 1/1999 | Edlund |
| 5,929,286 | A | 7/1999 | Krumpelt et al. |
| 6,025,403 | A | 2/2000 | Marler et al. |
| 6,083,425 | A | 7/2000 | Clawson et al. |
| 6,126,908 | A | 10/2000 | Clawson et al. |
| 6,436,363 | B1 | 8/2002 | Hwang et al. |
| 6,506,359 | B1 | 1/2003 | Maruko |
| 6,524,550 | B1 | 2/2003 | Chintawar et al. |
| 6,576,217 | B1 | 6/2003 | Nojima et al. |

FOREIGN PATENT DOCUMENTS

| | | |
|---|---|---|
| EP | 1 094 030 A2 | 10/2000 |
| WO | WO 98/08771 | 3/1998 |
| WO | WO 00/66487 | 11/2000 |

OTHER PUBLICATIONS

S. Ahmed, et al., "Catalytic Partial Oxidation Reforming of Hydrocarbon Fuels," Fuel Cell Seminar Abstracts Nov. 16-19, 2000, Palm Springs, CA, pp. 242-245 (1998).

S. G. Clark, et al., "Challenges for fuel cells in transport applications," J. Power Sources, 86, pp. 40-51, (2000); Elsevier Publ., New York, NY.

J. P. Kopasz, et al., "Effects of Gasoline Components on Fuel Processing and Implications for Fuel Cell Fuels," presented at 2000 Fuel Cell Seminar, Oct. 30-Nov. 2, 2000, Portland, OR.

R. Kumar, et al., "The Low Temperature Partial-Oxidation Reforming of Fuels for Transportation Fuel Cell Systems," 1996 Fuel Cell Seminar Abstracts, Nov. 17-20, 1996, Orlando, FL, pp. 750-753 (1996).

H. D. Lee, et al., Fuel Flexible Fuel Processor for Reforming Hydrocarbon Fuels, presented at 2000 AIChE Meeting, Nov. 12-17, 2000, Los Angeles, CA.

D. Myers, et al., "Reducing the Volume/Weight of the Fuel Post Processor for PEFC Power Systems," presented at 2000 Fuel Cell Seminar, Oct. 30-Nov. 2, 2000, Portland, OR.

R. S. Wegeng, et al., "Compact fuel processors for fuel cell powered automobiles based on microchannel technology," Fuel Cells Bulletin, 2001, vol. 3. No. ER28, pp. 8-13; Elsevier Publ., New York, NY.

Krumpelt, M., et al., "Catalytic Autothermal Reforming for Fuel Cell Systems," published by Argonne National Labatory.

Ahmed, S., et al., "Hydrogen From Hydrocarbon Fuels for Fuel Cells,"*International Journal of Hydrogen Energy*, vol. 26, pp. 291-301 (2001); published by Elsevier Science Ltd.

FUEL PROCESSOR AND METHOD FOR GENERATING HYDROGEN FOR FUEL CELLS

CROSS REFERENCES TO RELATED APPLICATIONS

This application is a divisional of and claims priority to U.S. application Ser. No. 09/816,676, filed Mar. 23, 2001, the content of which is hereby incorporated by reference in its entirety and for all purposes as if fully set forth herein.

STATEMENT OF GOVERNMENT RIGHTS

The United States government has rights in this invention pursuant to Contract No. W-31-108-ENG-38 between the United States Department of Energy and the University of Chicago representing Argonne National Laboratory.

FIELD OF THE INVENTION

This invention pertains generally to the field of hydrogen generation. More specifically, the invention relates to a fuel processor and method for autothermally reforming hydrocarbons to produce hydrogen for fuel cell power generating systems.

BACKGROUND OF THE INVENTION

Fuel cells electrochemically oxidize hydrogen to generate electric power. Without a hydrogen refueling infrastructure, hydrogen has to be produced from available fuels at the point of use. In remote, distributed, and portable power applications, such fuel cell systems require small, lightweight fuel processors that are designed for frequent start ups and are capable of operating at varying loads.

Two processes are industrially used to generate hydrogen from hydrocarbon fuels. These two processes include the steam reforming process and the partial oxidation reforming process. The steam reforming hydrogen production process is the more commonly used process used to produce hydrogen. This is especially true in the chemical industry. Steam reforming is an endothermic reaction that is typically slow to start up. In steam reforming processes, steam reacts with a hydrocarbon fuel in the presence of a catalyst to produce hydrogen. In steam reforming, the process equipment tends to be heavy and is designed for continuous operation under steady state conditions making such systems unsuitable for applications with frequent load variations such as those for use in transportation applications. Additionally, because of the endothermic nature of the process, steam reforming reactors are heat transfer limited. These attributes of steam reforming processes makes them unsuitable for use in remote, distributed, and portable power applications such as for use in a motor vehicles.

Partial oxidation reforming processes are based on exothermic reactions in which some fuel is directly combusted. In partial oxidation reforming, oxygen reacts with a hydrocarbon fuel in the presence of a catalyst to produce hydrogen. Heat transfer limitations are eliminated in partial oxidation reforming processes due to the exothermic nature of the reaction. Additionally, partial oxidation reforming hydrogen production processes and the equipment used in such processes generally allows for faster start ups compared to steam reforming processes. However, reactors used in partial oxidation reforming processes generally operate at temperatures of from about 1100° C. to about 1200° C. to prevent coking in the reactor. One disadvantage associated with partial oxidation reforming is that reactor materials capable of operating at the high temperatures of partial oxidation processes must be used. Suitable materials for use in partial oxidation reforming reactors include ceramics. Ceramic reforming reactors are both expensive and difficult to fabricate.

U.S. Pat. No. 5,248,566 issued to Kumar et al. discloses a fuel cell system for use in transportation applications. In the disclosed fuel cell, a partial oxidation reformer is connected to a fuel tank and to a fuel cell. The partial oxidation reformer produces hydrogen-containing gas by partially oxidizing and reforming the fuel with water and air in the presence of an oxidizing catalyst and a reforming catalyst.

U.S. Pat. No. 6,025,403 issued to Marler et al. discloses a process for integrating an autothermal reforming unit and a cogeneration power plant in which the reforming unit has two communicating fluid beds. The first fluid bed is a reformer reactor containing inorganic metal oxide and which is used to react oxygen and light hydrocarbons at conditions sufficient to produce a mixture of synthesis gas, hydrogen, carbon monoxide, and carbon dioxide. The second fluid bed is a combustor-regenerator which receives spent inorganic metal oxide from the first fluid bed and which provides heat to the inorganic metal and balance the reaction endotherm, by combusting fuel gas in direct contact with the inorganic metal oxide producing hot flue gas. In preferred embodiments, steam is also fed to the reformer reactor and a catalyst may be used with the inorganic metal oxide.

U.S. Pat. No. 6,126,908 issued to Clawson et al. and WO 98/08771 disclose an apparatus and method for converting hydrocarbon fuel or an alcohol into hydrogen gas and carbon dioxide. The apparatus includes a first vessel having a partial oxidation reaction zone and a separate steam reforming reaction zone that is distinct from the partial oxidation reaction zone. The first vessel of the apparatus has a first vessel inlet at the partial oxidation reaction zone and a first vessel outlet at the steam reforming zone. The reformer also includes a helical tube that has a first end connected to an oxygen-containing source and a second end connected to the first vessel at the partial oxidation reaction zone. Oxygen gas from an oxygen-containing source can be directed through the helical tube to the first vessel. The apparatus includes a second vessel with both an inlet and outlet. The second vessel is annularly disposed about the first vessel, and the helical tube is disposed between the first vessel and the second vessel and gases from the first vessel can be directed through the second vessel. The temperature in the partial oxidation zone within the apparatus is preferably maintained in the range of from about 950° C. to about 1150° C.

WO 00/66487 discloses an autothermal reforming system with a reformer reactor, integrated shift beds, preferential oxidation reactor, auxiliary reactor, and system controls. The reformer reactor of the autothermal reforming system is similar to that disclosed in U.S. Pat. No. 6,126,908 issued to Clawson et al. and WO 98/08771 in that it has distinct and separate partial oxidation, steam reforming, low temperature shift, and high temperature shift zones. The exothermic reaction in the partial oxidation chamber is self-sustaining and maintains an operating temperature in the range of from about 700° C. to about 1,200° C. for an embodiment of a catalyzed partial oxidation chamber or at a temperature of from about 1,200° C. to about 1,700° C. for an embodiment that uses a non-catalyzed partial oxidation zone.

U.S. Pat. No. 5,458,857 issued to Collins et al. discloses a combined reformer and shift apparatus. The combined reformer and shift reactor comprises a cylindrical reforming chamber arranged within and on the axis of a cylindrical vessel. An annular steam generator is arranged within, and coaxially with the vessel. The steam generator is arranged around the reforming chamber. A plurality of shift reactors extend axially, with respect to the vessel through, through the steam generator. Methane and steam are supplied via helically coiled pipe to the reforming chamber and air is supplied via helically coiled pipe. The methane and steam mixture and air flowing through the pipes are preheated by the reforming chamber product gases flowing in annular passage. The methane is preheated to prevent quenching of the steam in the disclosed apparatus and method of operation. The normal operating temperature in the reforming chamber is 700° C. to 1200° C. and the low temperature shift reactors are operated at a temperature between 140° C. and 250° C.

U.S. Pat. No. 5,861,137 issued to Edlund discloses a steam reformer with internal hydrogen purification that include internal bulk hydrogen purification, internal hydrogen polishing to remove trace levels of carbon monoxide and carbon dioxide, an integrated combustion method utilizing waste gas to heat the reformer, efficient integration of heat transfer, and compact design. The steam reformer includes a concentric cylindrical architecture nesting an annular combustion region, an annular reforming region separate from the combustion region, an annular hydrogen transport region, and a cylindrical polishing region. Thus, the reforming apparatus disclosed is similar to other conventional apparatus in having distinct and separate chambers for partial oxidation and steam reforming.

A need remains for a fuel processor that optimizes the production of hydrogen in autothermal reforming processes such that the fuel processor can be manufactured from conventional materials.

SUMMARY OF THE INVENTION

The invention provides a fuel processor and a method for generating a $H_2$ rich gas stream.

A method of producing a $H_2$ rich gas stream is provided which includes supplying an $O_2$ rich gas, steam, and fuel to an inner reforming zone of a fuel processor that includes a partial oxidation catalyst and a steam reforming catalyst or a combined partial oxidation and steam reforming catalyst. The method also includes contacting the $O_2$ rich gas, steam, and fuel with the partial oxidation catalyst and the steam reforming catalyst or the combined partial oxidation and steam reforming catalyst in the inner reforming zone to generate a hot reformate stream. The method still further includes cooling the hot reformate stream in a cooling zone to produce a cooled reformate stream. Additionally, the method includes removing sulfur-containing compounds from the cooled reformate stream by contacting the cooled reformate stream with a sulfur removal agent. The method still further includes contacting the cooled reformate stream with a catalyst that converts water and carbon monoxide to carbon dioxide and $H_2$ in a water-gas-shift zone to produce a final reformate stream in the fuel processor.

A preferred method for producing a $H_2$ rich gas stream is provided in which the hot reformate is cooled by directly injecting water into the hot reformate stream. In other preferred methods, the hot reformate stream is at a temperature ranging from about 600° C. to about 800° C.

Preferred methods are provided in which the catalyst in the inner reforming zone is a combined partial oxidation and steam reforming catalyst. Such preferred catalysts include a transition metal and an oxide-ion conducting portion. The transition metal in such catalysts is selected from platinum, palladium, ruthenium, rhodium, iridium, iron, cobalt, nickel, copper, silver, gold, or combinations of these, and the oxide-ion conducting portion is a ceramic oxide selected from those crystallizing in the fluorite structure or $LaGaO_3$. Still other methods are provided in which the combined partial oxidation and steam reforming catalyst is platinum on gadolinium doped ceria.

A method of producing a $H_2$ rich gas stream is further provided in which cooled reformate stream is at a temperature ranging from about 200° C. to about 400° C. after cooling in the cooling zone. Still other methods are provided which further include passing the hot reformate gas through an outer reforming zone adjacent to the inner reforming zone. In such methods the outer reforming zone preferably includes a partial oxidation catalyst and a steam reforming catalyst or a combined partial oxidation and steam reforming catalyst such as those described above.

Still further methods for producing a $H_2$ rich gas stream are provided in which the inner reforming zone is formed of stainless steel. In yet other methods, the steam and fuel are supplied to the inner reforming zone through a single pipe as a mixture and the $O_2$ rich gas is separately supplied to the inner reforming zone. In still other methods, the $O_2$ rich gas is supplied to the inner reforming zone through a tube surrounded by the inner reforming zone.

Yet other methods for producing a $H_2$ rich gas stream are provided in which the steam, the fuel, and the $O_2$ rich gas are supplied to the inner reforming zone through a single pipe as a mixture.

In still other methods of producing a $H_2$ rich gas stream also include heating the steam before it is introduced into the single pipe and heating the $O_2$ rich gas before it is introduced into the single pipe. In certain such methods, the steam is heated by passing it through a steam heating zone in the fuel processor, and the $O_2$ rich gas is heated by passing it through an air heating zone in the fuel processor.

Still further methods for producing a $H_2$ rich gas stream are provided in which the fuel has the formula $C_nH_mO_p$ where n has a value ranging from 1 to 20 and is the average number of carbon atoms per molecule of the fuel, m has a value ranging from 2 to 42 and is the average number of hydrogen atoms per molecule of the fuel, p has a value ranging from 0 to 12 and is the average number of oxygen atoms per molecule of the fuel. In such methods, the molar ratio of $O_2$ supplied to the inner reforming zone per mole of fuel is represented by the symbol x and has a value ranging from about $0.5x_0$ to about $1.5x_0$ where $x_0$ is equal to $0.312n-0.5p+0.5(\Delta H_{f,fuel}/\Delta H_{f,water})$, n and p have the values described above, $\Delta H_{f,fuel}$ is the heat of formation of the fuel, and $\Delta H_{f,water}$ is the heat of formation of water. Still other such methods are provided in which the molar ratio of steam supplied to the inner reforming zone per mole of fuel is a value ranging from about $0.8(2n-2x-p)$ to about $2.0(2n-2x-p)$.

Yet further methods of producing a $H_2$ rich gas stream are provided in which the sulfur removal agent is zinc oxide whereas in still other methods the catalyst that converts water and carbon monoxide to carbon dioxide and $H_2$ in the water-gas-shift zone comprises a noble metal on ceria where the noble metal is selected from ruthenium, rhodium, palladium, platinum, and combinations of these metals.

Additional methods of producing a $H_2$ rich gas stream are provided which include supplying the final reformate stream to a preferential oxidation unit that includes a catalyst that preferentially oxidizes carbon monoxide to carbon dioxide.

Still another method of producing a $H_2$ rich gas stream is provided that includes contacting the cooled reformate stream with at least two different catalysts in at least two different water-gas-shift zones, the at least two different catalysts converting water and carbon monoxide to carbon dioxide and $H_2$ to produce a final reformate stream in the fuel processor.

The invention also provides a fuel processor for generating a $H_2$ rich gas from a fuel. The fuel processor includes an inlet projecting through an exterior housing of the fuel processor attached to a steam line, an $O_2$ rich gas line, and a fuel line; an inner reforming zone including a sidewall, a first end connected to the inlet, a partial oxidation catalyst and a steam reforming catalyst or a combined partial oxidation and steam reforming catalyst, and a second end; an outer reforming zone including the sidewall of the inner reforming zone, an outer sidewall, a first end connected to the second end of the inner reforming zone, and a second end; a cooling zone that includes a first end connected to the second end of the outer reforming zone and a second end; a sulfur removal zone that includes a sulfur removal agent, a first end connected to the second end of the cooling zone, and a second end; and a water-gas-shift zone that includes a catalyst that catalyzes the conversion of carbon monoxide and water to carbon dioxide and $H_2$, a first end connected to the second end of the sulfur removal zone; and a second end connected to an outlet of the fuel processor.

The invention also provides a fuel processor in which the cooling zone includes an injection tube that allows water to be directly injected into the cooling zone. In still other provided fuel processors the outer reforming zone includes a partial oxidation catalyst and a steam reforming catalyst or a combined partial oxidation and steam reforming catalyst.

The invention further provides a fuel processor in which the inner reforming zone includes a combined partial oxidation and steam reforming catalyst comprising a transition metal and an oxide-ion conducting portion such as the catalysts described above.

The invention still further provides a fuel processor in which the sidewall of the inner reforming zone and the outer sidewall of the outer reforming zone are formed from stainless steel.

Still other fuel processors are provided that include a steam heating zone disposed between at least a portion of the outer reforming zone and at least a portion of the water-gas-shift zone while other fuel processors include an air heating zone disposed between at least a portion of the water-gas shift zone and the exterior housing of the fuel processor.

Still other fuel processors are provided in which the sulfur-removal agent comprises zinc oxide while in still other fuel processors the catalyst in the water-gas-shift zone comprises a noble metal on ceria, wherein the noble metal is selected from the group consisting of ruthenium, rhodium, palladium, platinum, and combinations thereof.

Another fuel processor according to the present invention includes: an inlet projecting through an exterior housing of the fuel processor into a mixing zone, the inlet attached to a steam line and a fuel line; an inner reforming zone including a sidewall, a first end connected to the inlet, and a second end; an inner tube attached to an $O_2$ rich gas line and at least partially surrounded by the inner reforming zone; an outer reforming zone including the sidewall of the inner reforming zone, an outer sidewall, a first end connected to the second end of the inner reforming zone, and a second end; a cooling zone including a first end connected to the second end of the outer reforming zone and a second end; a sulfur removal zone including a first end connected to the second end of the cooling zone, and a second end; and a water-gas-shift zone including a first end connected to the second end of the sulfur removal zone, and a second end connected to an outlet of the fuel processor.

The invention further provides a fuel processor such as that described above in which the water-gas-shift zone includes a first water-gas-shift zone and a separate second water-gas-shift zone. The first water-gas-shift zone includes a first end connected to the second end of the sulfur removal zone, and a second end, and the second water-gas-shift zone includes a first end connected to the second end of the first water-gas-shift zone and a second end connected to the outlet of the fuel processor. In still other such fuel processors, the second water-gas-shift zone comprises a cooling tube having an inlet and an outlet and extending through the second water-gas-shift zone.

Fuel processors are also provided in which the inner tube attached to the $O_2$ rich gas line extends into the mixing zone of the fuel processor.

Yet other fuel processor are provided that include a steam inlet that extends through the exterior housing of the fuel processor and is connected to a pipe that extends through the fuel processor to a steam outlet. The steam outlet in such fuel processors is connected to a steam line that is connected to the inlet projecting through the exterior housing and into the mixing zone.

Still other fuel processor according to the invention are providing that have a fuel inlet connected to a fuel line that runs through the fuel processor or around the exterior housing of the fuel processor to a fuel outlet. The fuel outlet of such fuel processors is connected to a fuel line that is connected to the inlet projecting through the exterior housing and into the mixing zone.

Yet another fuel processor is provided in which the cooling zone includes a coiled coolant tube that extends through the cooling zone of the fuel processor.

Still further fuel processors are provided in which the sidewall of the inner reforming zone and the outer sidewall of the outer reforming zone are formed of stainless steel or similar materials of construction.

Further features, and advantages of the present invention will be apparent from the following detailed description taken in conjunction with the appended drawings.

BRIEF DESCRIPTION OF THE DRAWING

The preferred exemplary embodiment of the invention will hereinafter be described in conjunction with the appended drawings.

DETAILED DESCRIPTION OF THE INVENTION

Figure 1:
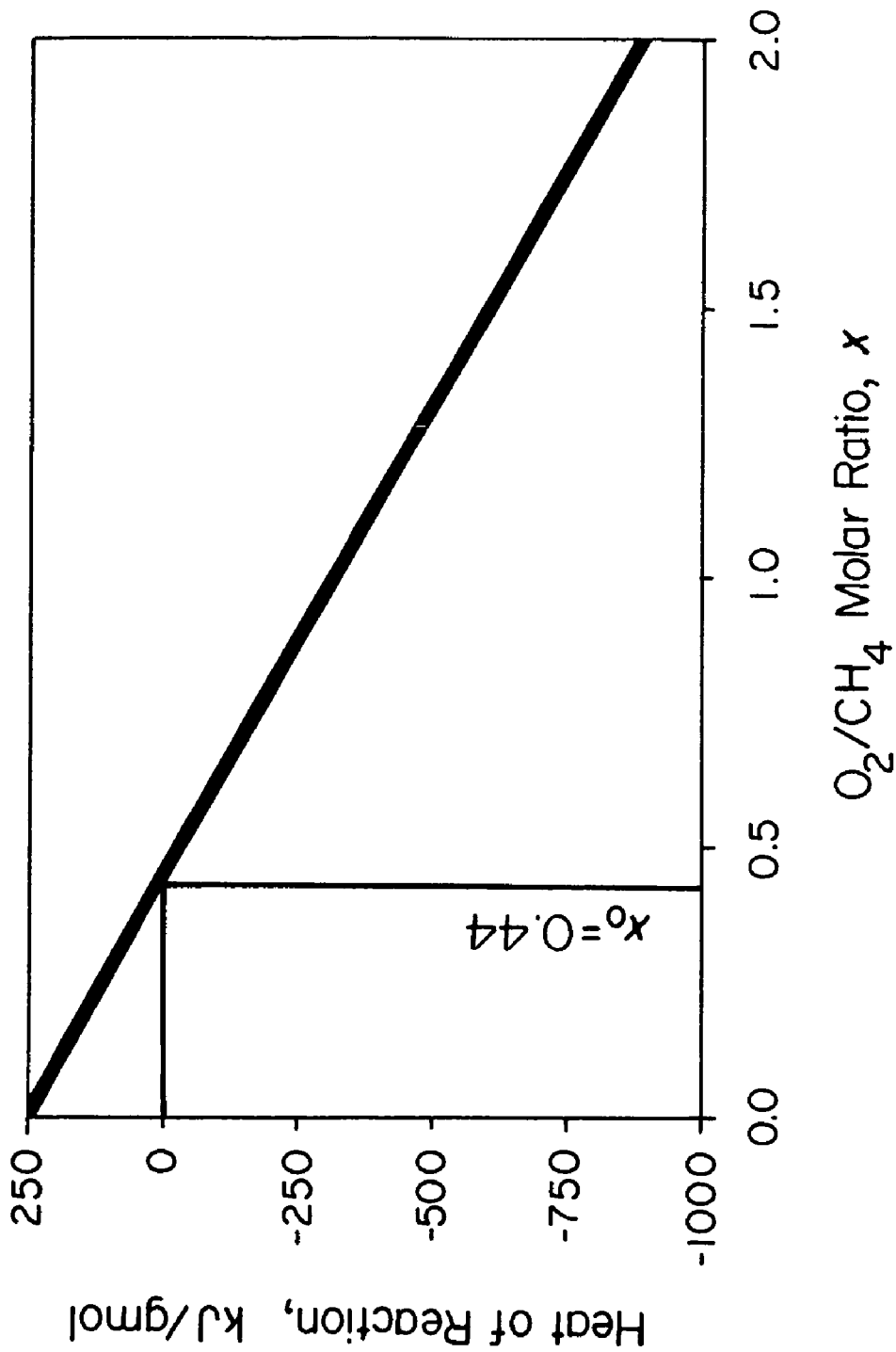
FIG. 1 is a graph of the heat of reaction (kJ/gmol) versus the molar ratio of $O_2$ to $CH_4$ (x) showing the thermoneutral point ($x_0$) for the autothermal reforming of $CH_4$ using liquid water.

Hydrogen used in fuel cells is typically generated from available fuels ($C_nH_mO_p$) by means of a reforming reaction. Three processes used to generate hydrogen include steam reforming, partial oxidation, and autothermal reforming.

Steam reforming is probably the most commonly used method for producing hydrogen in the chemical process industry. In steam reforming, a fuel reacts with steam in the presence of an appropriate catalyst to provide various carbon oxides and hydrogen. The steam reforming reaction is endothermic and as such exhibits a heat of reaction ($\Delta H_r$) greater than 0. In the steam reforming process, various carbon oxides including carbon monoxide and carbon dioxide are formed as byproducts along with the desired hydrogen. The carbon monoxide and carbon dioxide produced in the steam reforming reaction are removed from the reformate gas stream by a variety of reactions and scrubbing techniques, including, but not limited to, the water-gas-shift reaction in which carbon monoxide reacts with water to form carbon dioxide and hydrogen; methanation; carbon dioxide absorption in amine solutions; and pressure swing adsorption. The steam reforming reaction is strongly endothermic and reactor designs are thus typically limited by heat transfer considerations, rather than reaction kinetics. Consequently, reactors for use in steam reforming are designed to promote heat exchange and tend to be large and heavy.

Partial oxidation reformers react the fuel with a stoichiometric amount of $O_2$. The initial oxidation reaction results in heat generation and high temperatures as the reaction is strongly exothermic and thus has a heat of reaction ($\Delta H_r$) of less than 0. In the partial oxidation reaction, fuel reacts with oxygen typically a component of air to produce hydrogen and carbon oxides including carbon monoxide and carbon dioxide. The heat generated by the oxidation reaction raises the gas temperature to over 1,000° C. In fact, partial oxidation reactors are typically operated at temperatures of from 1,100° C. to 1200° C. because the gas phase oxidation of hydrocarbons requires these temperatures in order to prevent coking in the reactor.

The invented process and fuel processor designs overcome the high temperature problem of partial oxidation reactors, yet have excellent transient response capability, a significant problem associated with steam reforming. The fuel processor does this by providing at least one chamber in which partial oxidation and steam reforming are conducted simultaneously and by being designed such that heat generated from partial oxidation is used in the steam reforming reaction. In preferred embodiments, the heat generated by the partial oxidation reaction is used to heat the oxygen or air and water before they are fed into the reforming chamber in the fuel processor.

In the fuel processor and method of the present invention, a mixture of molecular oxygen and steam or water is used to convert fuels to a hydrogen rich gas. Typically, and preferably, the oxygen is a component of air so that the fuel processor uses air and water or steam, to convert the fuel to a hydrogen rich gas. Preferably, the molar ratios of air to fuel and water to fuel are controlled to provide optimal conditions for autothermally reforming the fuel into the hydrogen rich gas. This allows the reaction temperatures to be controlled, the production of $H_2$ to be optimized, and the use of stainless steel and other conventional materials to be used in construction of the fuel processor.

The chemical reaction used to represent the autothermal reforming of a fuel can be written as follows assuming the complete conversion of the fuel to carbon dioxide and hydrogen:

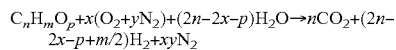

where:

$C_nH_mO_p$ is the fuel;

n is the number of carbon atoms per molecule of the fuel and the number of moles of carbon oxides formed per mole of the fuel;

m is the number of hydrogen atoms per molecule of the fuel;

p is the number of oxygen atoms per molecule of the fuel;

x is the molar ratio of molecular oxygen ($O_2$) per mole of the fuel;

y is the number of moles of $N_2$ per mole of the molecular oxygen that is supplied per mole of the fuel;

($2n-2x-p$) is the molar ratio of water per mole of the fuel;

($2n-2x-p+m/2$) is the number of moles of hydrogen produced per mole of the fuel; and xy is the number of moles of $N_2$ in the system per mole of the fuel.

If the oxygen to fuel ratio is defined as x, then the water to fuel molar ratio required to convert the carbon to carbon dioxide must be equal to $2n-2x-p$. The reaction will be endothermic at low values of x as the amount of oxygen will be insufficient to decrease the heat of reaction below 0. At high values of x, the reaction is exothermic as the amount of oxygen present in the reaction is sufficient to decrease the heat of reaction below 0. At an intermediate value of x ($x_0$, the thermoneutral point) the heat of reaction is zero. FIG. 1 is a graph of the heat of reaction versus the molar ratio of $O_2$ to $CH_4$ (x) for the autothermal reforming of methane using liquid water. As shown in FIG. 1, $x_0$ has the value of 0.44 for the autothermal reforming of methane using liquid water. At $x_0$, the heat of reaction is zero. When the molar ratio of oxygen to fuel increases beyond $x_0$, the reaction becomes exothermic as indicated by the negative heats of reactions. On the other hand, when the molar ratio of oxygen to fuel (x) drops below the value of $x_0$, the reaction becomes endothermic as indicated by the positive values for the heat of reaction.

Generally, the reforming process should be conducted at or close to the thermoneutral point ($x_0$). This means that the molar ratio of molecular oxygen to fuel supplied to the fuel processor should be as close to $x_0$ as possible since this represents the condition where the process has been found to be most efficient. However, the molar ratio of molecular oxygen to fuel may vary depending on the choice of catalyst. In certain preferred methods according to the present invention, the molar ratio of molecular oxygen supplied to the fuel processor per mole of fuel (x) is a value ranging from about $x_0$ to about $1.5x_0$ and in still other more preferred embodiments, the value ranges from about $0.5x_0$ to about $1.5x_0$. In other preferred processes, the molar ratio of molecular oxygen supplied to the fuel processor per mole of fuel is a value ranging from about $0.8x_0$ to about $1.4x_0$; from about $0.9x_0$ to about $1.3x_0$; or from about $0.95x_0$ to about $1.2x_0$.

Figure 2:
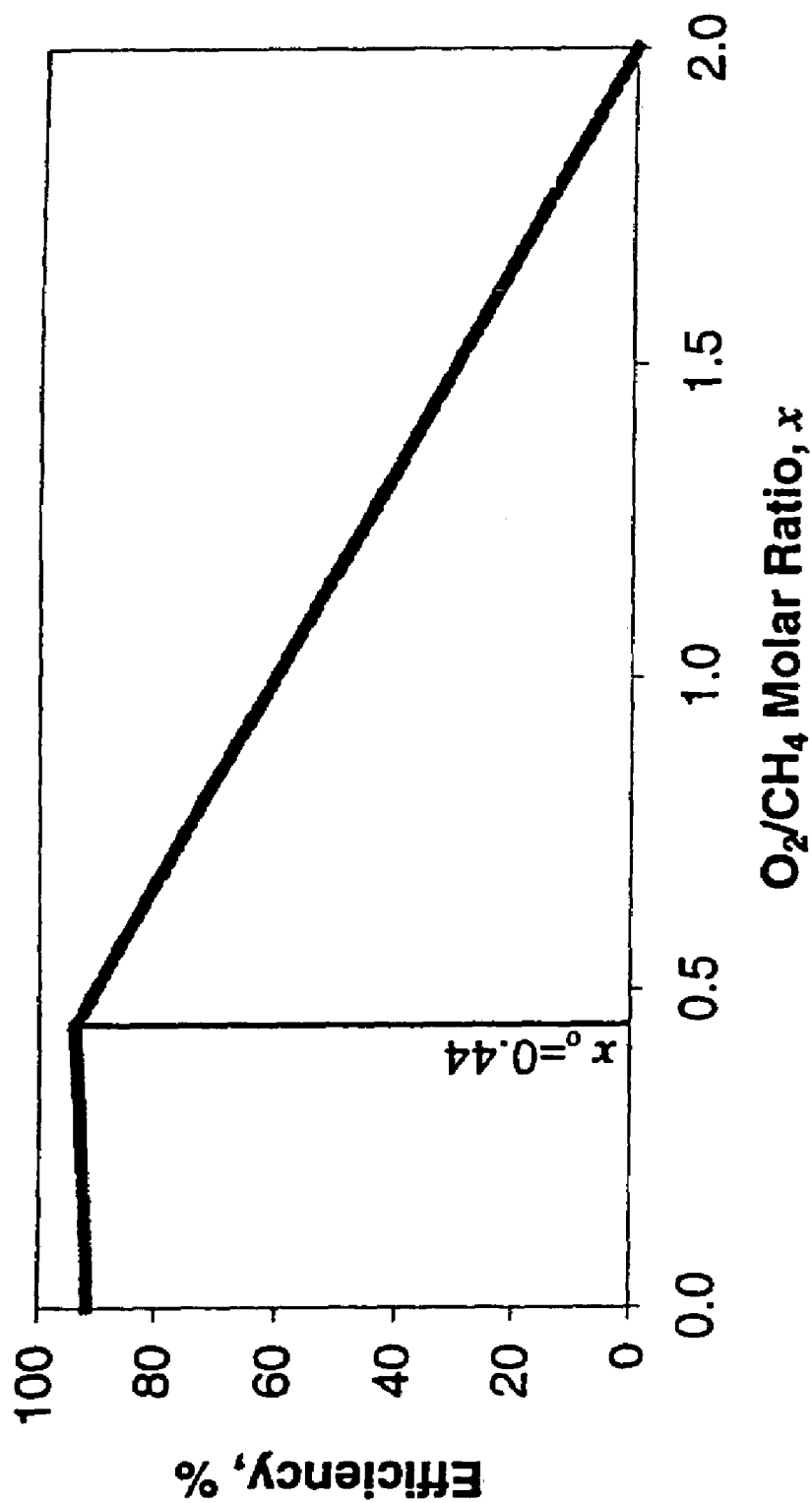
FIG. 2 is a graph of the efficiency versus the molar ratio of $O_2$ to $CH_4$ (x) for the reaction of $CH_4$, $O_2$ and liquid water to form a hydrogen rich gas stream.

FIG. 2 is a graph showing the energy efficiency as a function of the molar ratio of $CH_4$ to molecular oxygen for the generation of hydrogen from methane and water. As shown in FIG. 2, the autothermal conversion of methane and water to hydrogen is most efficient when the reaction is conducted with a molar ratio of molecular oxygen to fuel near the thermoneutral $x_0$ value. As shown in FIG. 2, the efficiency of the process remains quite high when the molar ratio of $O_2$ to $CH_4$ is less than $x_0$, but the efficiency drops off rapidly when the molar ratio of $O_2$ to $CH_4$ increases over $x_0$. For the purposes of this discussion, efficiency is defined as the lower heating value of the product hydrogen, as a percentage of the lower heating value of the fuel feed. Although the process is most efficient when the molar ratio of $O_2$ to the fuel is $x_0$, to achieve fast enough reaction rates and to obtain high hydrogen concentrations in the product gas, it is preferable to operate the reactor at a temperature of from about 100° C. to about 900° C. In another preferred process, the reactor is maintained at a temperature of from about 400° C. to about 700° C. In still other preferred processes, the reactor is maintained at a temperature of about 700° C. Preferred fuel processors for use in the method of the present invention include at least one reforming chamber in which the mixture of oxygen, fuel, and water is converted to a $H_2$ rich gas stream by both partial oxidation and steam reforming. In preferred processes according to the present invention, the $H_2$ rich gas exits the reforming portion at a temperature of from at or about 100° C. to at or about 900° C. and more preferably from at or about 400° C. to at or about 700° C. The preferred operating temperatures are achieved by increasing the air to fuel ratio slightly above the thermoneutral point.

As noted above, when the molar ratio of $O_2$ to fuel is greater than $x_0$, the reaction is exothermic such that the desired temperature may be achieved. The lower operating temperatures of the fuel processor that are obtained using the method of the present invention result in less carbon monoxide being produced in the reforming portion of the fuel processor. Thus, converting the mixture of oxygen, fuel, and water under the conditions described herein less carbon monoxide is produced and consequently, less carbon monoxide needs to be water-gas-shifted to produce carbon dioxide and $H_2$. This is one significant advantages offered when the method of the present invention is used.

Table 1 shows experimental examples for the conversion of various fuels at specified $O_2$ to fuel molar ratios (x); water to fuel molar ratios (2n−2x−p) [the water/fuel molar ratios in Table 1 are greater than 2n−2x−p]; and reactor temperatures. Table 1 also provides data regarding the composition of the hydrogen rich gas produced by the process as percentages on a dry nitrogen-free basis.

TABLE 1

Percentages of hydrogen, carbon monoxide, and carbon dioxide obtained from the autothermal reforming of hydrocarbon fuels.

| Hydrocarbon ($C_nH_mO_p$) | $O_2/C_nH_mO_p$ | $H_2O/C_nH_mO_p$ | Temp (° C.) | Composition (%) Dry, $N_2$-free basis | | |
|---|---|---|---|---|---|---|
| | | | | $H_2$ | CO | $CO_2$ |
| Iso-Octane | 3.7 | 9.1 | 630 | 60 | 16 | 20 |
| Cyclohexane | 2.8 | 8.2 | 700 | 59 | 16 | 24 |
| 2-Pentene | 2.3 | 6.0 | 670 | 60 | 18 | 22 |
| Ethanol | 0.46 | 2.4 | 580 | 62 | 15 | 18 |
| Methanol | 0.3 | 0.53 | 450 | 60 | 18 | 20 |
| Methane | 0.5 | 1.8 | 690 | 70 | 14 | 16 |

The molar ratio of water to fuel (2n−2n−p) has also been found to effect the efficiency of hydrogen production. Preferably, the molar ratio of water to fuel supplied to the fuel processor is a value ranging from about 0.8(2n−2−p) to about 2(2n−2x−p). In other preferred methods of generating a hydrogen rich gas from a fuel, the molar ratio of water to fuel ranges from about 0.9(2n−2x−p) to about 1.5(2n−2x−p); from about 0.95(2n−2x−p) to about 1.2(2n−2x−p); or from about 1.0(2n−2x−p) to about 1.1 (2n−2n−p). In most preferred methods according to the present invention, the molar ratio of molecular oxygen supplied to the fuel processor per mole of fuel (x) is a value ranging from about $0.95x_0$ to about $1.2x_0$ and the molar ratio of water supplied to the fuel processor per mole of fuel is a value ranging from about 1.0(2n−2x−p) to about 1.1(2n−2x−p). Because the values of $x_0$ and (2n−2x−p) are relatively simple to ascertain, preferred methods according to the present invention are those in which these values are predetermined prior to converting the mixture of oxygen, fuel and water to the $H_2$ rich gas stream. Based on catalyst selection and other considerations, preferred methods include choosing values of $x_0$ and or (2n−2x−p) prior to or during the production of $H_2$ process.

As noted above, the invention provides a method for generating hydrogen rich gas and includes supplying a mixture of $O_2$, fuel, and water to a fuel processor and converting the mixture to the hydrogen rich gas stream. Preferably, the conversion of the mixture of molecular oxygen, fuel, and water to the $H_2$ rich gas stream includes contacting the mixture with a catalyst in the fuel processor to produce the $H_2$ rich gas stream. As described above, the molar ratio of $O_2$ to fuel and the molar ratio of water to fuel are both dependent on the determination of the value of $x_0$ for a particular fuel. The value of $x_0$ for a particular fuel of formula $C_nH_mO_p$ may be determined using the equation $0.312n-0.5p+0.5(\Delta H_{f, fuel}/\Delta H_{f, water})$ where $\Delta H_{f, fuel}$ is the heat of formation of the fuel and $\Delta H_{f, water}$ is the heat of formation of water.

Generally, the invention provides a fuel processor and a method of generating a hydrogen ($H_2$) rich gas from a fuel. The $H_2$ rich gas in the reformate stream exiting the fuel processor is generally supplied to a fuel cell for use in generating electricity, and is very suitable for use in vehicles as part of a system for supplying energy to the vehicle. Preferably, the reformate stream exiting the fuel processor passes through a preferential oxidation unit prior to being supplied to the fuel cell. The preferential oxidation unit selectively oxidizes carbon monoxide remaining in the reformate stream to carbon dioxide. The method includes supplying a mixture of molecular oxygen ($O_2$), fuel, and water to a fuel processor and converting the mixture of molecular oxygen, fuel, and water in the fuel processor to the hydrogen rich gas. Preferably, the mixture of oxygen, fuel, and water is contacted with a catalyst in the fuel processor to produce the $H_2$ rich gas. The fuel has the formula $C_nH_mO_p$ where n has a value ranging from 1 to 20 and represents the average number of carbon atoms per molecule of the fuel, m has a value ranging from 2 to 42 and represents the average number of hydrogen atoms per molecule of the fuel, and p has a value ranging from 0 to 12 and represents the average number of oxygen atoms per molecule of the fuel. The molar ratio of molecular oxygen supplied to the fuel processor per mole of fuel is a value ranging from about $0.5x_0$ to about $1.5x_0$, and the value of $x_0$ is equal to $0.312n-0.5p+0.5 (\Delta H_{f, fuel}/\Delta H_{f, water})$ where n and p have the values described above, $\Delta H_{f, fuel}$ is the heat of formation of the fuel, and $\Delta H_{f, water}$ is the heat of formation of water.

As noted above, the thermoneutral point ($x_0$) may be readily calculated for any fuel using the following equation as long as the values of n, p, and heat of formation of the fuel is known:

$$x_0 = 0.312n - 0.5p + 0.5(\Delta Hf, \text{fuel}/\Delta Hf, \text{water})$$

where:

n is the number of carbon atoms in the fuel molecule;
p is the number of oxygen atoms in the fuel molecule;
$\Delta H_{f, fuel}$ is the heat of formation of the fuel at 298K; and
$\Delta H_{f, water}$ is the heat of formation of water at 298K which has a value of −68,317 cal/gmol or −68,317 kcal/gmol when the feed consists of water in the liquid phase, and has a value of −57,798 cal/gmol or −57.798 kcal/gmol when the feed consists of water in the vapor phase.

Using the above equation, the value of $x_0$ may be calculated for a fuel such as methane ($CH_4$) for which n=1, m=4, and p=0. Methane has a heat of formation of −17.9 kcal/gmol so $x_0 = 0.312(1) - 0.5(0) + 0.5(-17.9/-68.3)$ with the units not shown for the heats of formation for the fuel and the water since they cancel each other out. Thus, according to the equation $x_0=0.312+0.5(0.262)$ or a value of 0.443 for methane, where water in the feed is in the liquid phase.

Table 2 provides $x_0$ values for a number of fuels based upon the calculation method described above. The heats of formation for numerous organic compounds and fuels are readily known and can be obtained from such sources as the *CRC Handbook of Chemistry and Physics*. The method can be used to calculate the thermoneutral point ($x_0$) for pure fuels such as methane as described above. It can also be used to calculate the thermoneutral point for a fuel that comprises a mixture of materials such as gasoline where n is the average number of carbon atoms per mole of the fuel mixture, m is the average number of hydrogen atoms per mole of the fuel mixture, and p is the average number of oxygen atoms per mole of the fuel mixture. Thus, the above-described method for calculating the $x_0$ value may be used for any pure fuel or mixture of fuels as long as the heat of formation of the fuel is known and the values for n, m, and p are ascertained which is simply accomplished in the case of pure fuels.

TABLE 2

Calculated thermoneutral $O_2$/fuel ratios ($x_0$) and maximum theoretical efficiencies at $x_0$ for various fuels.

| Fuel $C_nH_mO_p$ | n | m | p | $\Delta H_f$ (kcal/gmol) | m/2n | $x_0$ | Efficiency (%) |
|---|---|---|---|---|---|---|---|
| Methanol $CH_3OH$ | 1 | 4 | 1 | −57.1 | 2 | 0.230 | 96.3 |
| Methane $CH_4$ | 1 | 4 | 0 | −17.9 | 2 | 0.443 | 93.9 |
| Acetic Acid $C_2H_4O_2$ | 2 | 4 | 2 | −116.4 | 1 | 0.475 | 94.1 |
| Ethane $C_2H_6$ | 2 | 6 | 0 | −20.2 | 1.5 | 0.771 | 92.4 |
| Ethylene Glycol $C_2H_6O_2$ | 2 | 6 | 2 | −108.6 | 1.5 | 0.418 | 95.2 |
| Ethanol $C_2H_6O$ | 2 | 6 | 1 | −66.2 | 1.5 | 0.608 | 93.7 |
| Pentene $C_5H_{10}$ | 5 | 10 | 0 | −5.0 | 1 | 1.595 | 90.5 |
| Pentane $C_5H_{12}$ | 5 | 12 | 0 | −35.0 | 1.2 | 1.814 | 91.5 |
| Cyclohexane $C_6H_{12}$ | 6 | 12 | 0 | −37.3 | 1 | 2.143 | 90.7 |
| Benzene $C_6H_6$ | 6 | 6 | 0 | 11.7 | 0.5 | 1.784 | 88.2 |
| Toluene $C_7H_8$ | 7 | 8 | 0 | 2.9 | 0.571 | 2.161 | 88.6 |
| Iso-Octane $C_8H_{18}$ | 8 | 18 | 0 | −62.0 | 1.125 | 2.947 | 91.2 |
| Gasoline $C_{7.3}H_{14.8}O_{0.1}$ | 7.3 | 14.8 | 0.1 | −53.0 | 1.014 | 2.613 | 90.8 |

Various fuels may be used in the method of the present invention. Fuels are generally represented by the formula $C_nH_mO_p$ where n represents the number of carbon atoms in the molecular formula of the fuel, m represents the number of hydrogen atoms in the molecular formula of the fuel, and p represents the number of oxygen atoms, if any, in the fuel. In preferred fuels according to the present invention, n has a value ranging from 1 to 20, m has a value ranging from 2 to 42, and p has a value ranging from 0 to 12. Preferred fuels for use in the method of the present invention include straight and branched chain alkanes, alkenes, alkynes, alkanols, alkenols, and alkynols; cycloalkanes; cycloalkenes; cycloalkanols; cycloalkenols; aromatic compounds including, but not limited to toluene, xylene, and benzene; ketones, aldehydes, carboxylic acids, esters, ethers, sugars, and generally other organic compounds containing carbon, hydrogen, and optionally oxygen. One preferred group of fuels includes alkanes such as methane, ethane, and the various isomers of propane, butane, pentane, hexane, heptane, and octane. Alkenes corresponding to the listed alkanes are also preferred for use in the present invention. Alcohols are another preferred fuel for use in the present invention. Preferred alcohols include methanol, ethanol, ethylene glycol, propylene glycol, and the various isomers of propanol, butanol, pentanol, hexanol, heptanol, and octanol. Other preferred fuels include cyclohexane and cyclopentane. One preferred group of fuels include methane, methanol, ethane, ethanol, acetic acid, ethylene glycol, pentene, pentane, cyclohexane, benzene, toluene, iso-octane, and gasoline.

Fuels for use in the present invention may also include mixtures such as natural gas which primarily comprises methane, and gasoline and diesel which both include a mixture of various compounds. One preferred group of fuels for use in the present invention includes methane, methanol, ethane, ethylene, ethanol, propane, propene, i-propanol, n-propanol, butane, butene, butanol, pentane, pentene, hexane cyclohexane, cyclopentane, benzene, toluene, xylene, natural gas, liquefied petroleum gas, iso-octane, gasoline, kerosene, jet fuel, and diesel. Other more preferred fuels include methane, natural gas, propane, methanol, ethanol, liquefied petroleum gas, gasoline, kerosene, jet fuel, and diesel. It will be understood that, for the purposes of this discussion, that the value of n for fuels that comprise more than one compound will be the average value based on the percentages of components. The same is true for m and p. Thus, n may be said to represent the average number of carbon atoms per molecule of the fuel, m may be said to represent the average number of hydrogen atoms per molecule of the fuel, and p may be said to represent the average number of oxygen atoms per molecule of the fuel. Thus, for a mixture of hexane and ethanol in which each component is present in an amount of 50 percent based on the number of moles the formula for determining n is 0.5(6 carbon atoms from hexane)+0.5(2 carbon atoms from ethanol)=4; the formula for determining the value of m is 0.5 (14H atoms from hexane)+0.5 (6H atoms from ethanol)=10; and the formula for determining the value of p is 0.5 (0 O atoms from hexane)+0.5 (1 O atom from ethanol)=0.5.

Various catalysts may be used in the method of the present invention. Examples of particularly suitable catalysts for use in autothermal reforming are set forth in U.S. Pat. No. 5,929,286, the entire disclosure of which is incorporated herein. Thus, in a preferred method according to the invention, the catalyst includes a transition metal and an oxide-ion conducting portion, and the mixture of molecular oxygen, fuel, and water is contacted with the catalyst at a temperature of 400° C. or greater. Preferably, the transition metal of the catalyst includes a metal selected from platinum, palladium, ruthenium, rhodium, iridium, iron, cobalt, nickel, copper, silver, gold, and mixtures of these and the oxide-ion conducting portion of the catalyst is selected from a ceramic oxide from the group crystallizing in the fluorite structure or $LaGaO_3$ or mixtures of these. In other preferred methods according to the invention, the catalyst is an autothermally reforming catalyst that operates at a temperature ranging from about 100° C. to about 700° C. Other preferred temperature ranges include temperatures from about 100° C. to about 1,000° C., from about 200° C. to about 900° C., from about 800° C. to about 900° C., from about 400° C. to about 680° C., from about 400° C. to about 580° C., from about 300° C. to about 600° C., and from about 350° C. to about 700° C.

As noted above, the hydrogen rich gas produced by the method of the present invention includes carbon oxides including carbon dioxide and carbon monoxide. In particularly preferred processes according to the invention, the $H_2$ rich gas which also comprises carbon monoxide and carbon dioxide is contacted with a second catalyst effective at converting carbon monoxide and water into carbon dioxide by the water-gas-shift reaction. Thus, preferred fuel processors include a carbon monoxide reduction chamber and a second gas is produced after contacting the catalyst in the carbon monoxide reduction chamber which is further enriched in $H_2$ and which has a reduced level of carbon monoxide compared to the initial $H_2$ rich gas produced by the reaction of fuel, water, and oxygen in the reforming chamber. The water-gas-shift catalyst may include various catalysts including, but not limited to, iron chromium oxide, copper zinc oxide, or platinum on an oxide ion conductor (e.g. gadolinium doped ceria). Alternative formulations for the water-gas-shift catalyst include platinum, palladium, nickel, iridium, rhodium, cobalt, copper, gold, ruthenium, iron, silver, in addition to other transition metals on cerium oxide or oxide-ion conductors such as ceria doped with rare-earth elements including, but not limited to, gadolinium, samarium, yttrium, lanthanum, praseodymium, and mixtures of these. The ceria may also be doped with alkaline earth elements including, but not limited to, magnesium, calcium, strontium, barium, or mixtures of these. Typically, iron chromium oxide catalysts are operated between about 300° C. to 380° C., copper zinc oxide catalysts are operated between 200° C. and 260° C., and platinum catalysts are operated in the range of from about 200° C. to about 450° C.

Figure 3:
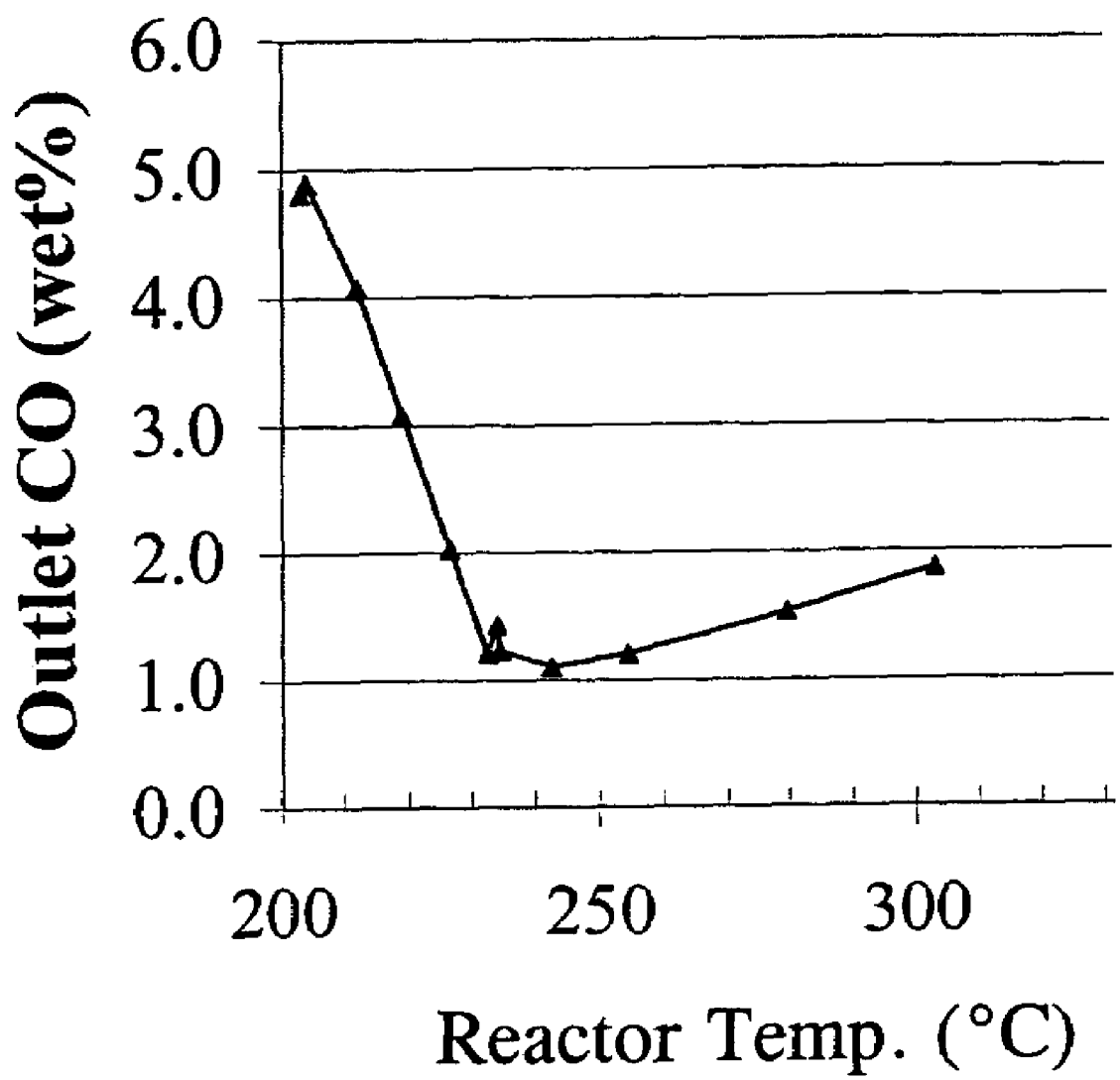
FIG. 3 is a graph showing the percentage of carbon monoxide contained in a product stream after emerging from a water-gas-shift reactor loaded with a catalyst (0.8 wt. % platinum on gadolinium doped ceria ($Pt/Ce_{0.8}Gd_{0.2}O_{1.95}$) as a function of reaction temperature.

The reaction temperature plays an important role in the amount of carbon monoxide emerging from a water-gas-shift reactor. The method of the present invention can thus be used to modify the temperature of gas streams that will be directed, after reforming, to a water-gas-shift reactor with a particular catalyst. For example, the molar ratio of molecular oxygen to fuel may be adjusted to produce a hotter or cooler stream that matches the preferred temperature range over which the water-gas shift catalyst functions. FIG. 3 is a graph showing the percentage of carbon monoxide contained in a product stream after emerging from a water-gas-shift reactor loaded with a catalyst (0.8 wt. % platinum on gadolinium doped ceria $(Pt/Ce_{0.8}Gd_{02}O_{1.95})$ as a function of reaction temperature. The reactant composition prior to contacting the water-gas-shift reactor on a dry basis was 10.5% CO, 31.2% $N_2$, 1.9% $CH_4$, and 43.4% $H_2$. The $H_2O/CO$ molar ratio in the reactant stream was 3.5. As shown in FIG. 3, for this particular platinum on gadolinium doped ceria catalyst stream, the preferred reaction temperature ranges from about 200° C. to about 300° C. More preferably, the reaction temperature ranges from about 210° C. to about 280° C. and still more preferably ranges from about 225° C. to about 270° C. Most preferably, the reaction temperature using the platinum on gadolinium doped ceria water-gas-shift catalyst ranges from about 225° C. to about 260° C. and is about 240° C.

Figure 4:
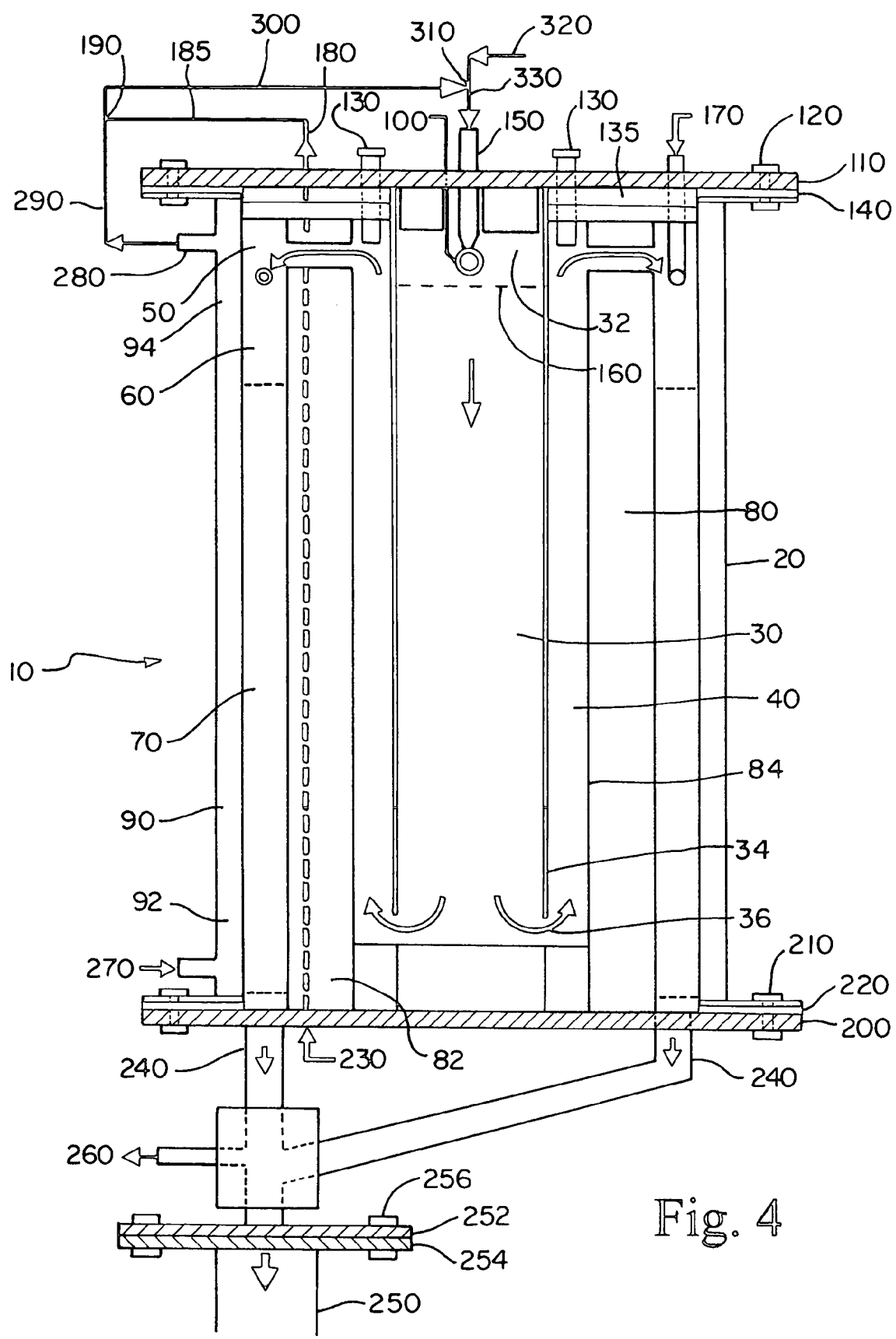
FIG. 4 is a cross sectional view of a fuel processor according to the present invention.

A cross-sectional view of a fuel processor for use in producing a hydrogen rich gas stream is shown generally in FIG. 4 where like numbers denote like elements. Fuel processor 10 includes an exterior housing 20 which is preferably, but not necessarily, cylindrical in shape and which is preferably, but not necessarily surrounded by a layer of insulating material (not shown). Fuel processor 10 also includes an inner reforming zone 30, an outer reforming zone 40, a cooling zone 50, a sulfur removal zone 60, and a water-gas-shift zone 70. Further included in fuel processor 10 is a steam heating zone 80, an air heating zone 90, and an ignition source 100.

Inner reforming zone 30 contains a partial oxidation catalyst and a steam reforming catalyst or a catalyst that is useful in catalyzing both partial oxidation and steam reforming. Preferred such catalysts are those described above. Outer reforming zone 40 optionally, but preferably contains the same catalyst or catalysts used in inner reforming zone 30. Thus, both partial oxidation and steam reforming are accomplished in inner reforming zone when the mixture of fuel oxygen, and steam contacts the catalysts. Sulfur removal zone 60 contains a material which is known to remove sulfur compounds, preferably $H_2S$ or COS, from the reformate gas stream. An example of a particularly useful sulfur removal agent is zinc oxide, which is converted to zinc sulfide upon reaction with $H_2S$ effectively removing sulfur from the gas stream. Water-gas-shift zone 70 contains a catalyst such as those described above for catalyzing the reaction of carbon monoxide and water to carbon dioxide and $H_2$.

A top plate 110 covers the top of fuel processor 10 and is secured with bolts 120 and uses a gasket 140 such as a graphite gasket to prevent leakage from the system. As shown in FIG. 4, tubular openings 130 typically pass through insulation 135 for loading catalysts into the outer reforming zone 40. Pipe 150 allows the reaction components to enter into a top part 32 of inner reforming zone 30. Top part 32 of inner reforming zone 30 acts as a mixing zone for the air, steam and fuel introduced into fuel processor 10. Coolant pipe 170 allows water or steam to be introduced through top plate 110 and into cooling zone 50. A separate and distinct steam outlet pipe 180 extends through top plate 110 allowing heated steam to exit from steam heating zone 80 and into reactant steam pipe 185 to juncture 190.

A bottom plate 200 covers the bottom of fuel processor 10 and is secured with bolts 210 and uses a gasket 220 to prevent leakage of pressure and reactants from the system. Pipe 230 allows water or steam to be introduced to a bottom portion 82 of steam heating zone 80. Reformate outlets 240 allow the $H_2$ rich reformate gas to exit fuel processor 10 before entering pipe 250 secured to outlet 240 through flanges 252 and 254 with bolts 256 upstream of a fuel cell or more preferably upstream of a preferential oxidation unit which is, in turn, upstream of the fuel cell. A sampling pipe 260 allows the composition of the reformate gas to be analyzed.

The exterior housing 20 may further comprise pipes that allow air to enter air heating zone 90. However as shown in FIG. 4, the bottom portion 92 of air heating zone 90 preferably contains an air inlet 270, and the top portion 94 of air heating zone 90 preferably contains an air outlet 280. Together air inlet 270 and air outlet 280 allow air or another $O_2$ rich gas to enter the bottom portion 92 of air heating zone 90 and exit the top portion 94 or air heating zone 90. Although the air heating zone 90 and steam heating zone 80 may be switched, the configuration shown in FIG. 4 is preferred due to the higher heat capacity of water compared to air.

Although other configurations are possible, as shown in FIG. 4, heated air leaving air heating zone 90 through air outlet 280 enters pipe 290 until it reaches juncture 190 where it is mixed with the heated steam entering juncture 190 through reactant steam pipe 185 from steam outlet pipe 180 and steam heating zone 80. The mixture of heated steam and air or another $O_2$ rich gas flows from juncture 190 through pipe 300 to juncture 310 where it is mixed with a fuel supplied through fuel feed pipe 320. Reactant feed pipe 330 is used to supply pipe 150, which allows the reactant gas to enter reforming zone 30.

In operation, a mixture of steam, and air or another suitable $O_2$ rich gas source is mixed with a suitable fuel such as those described above at juncture 310. Flow control valves or other metering devices can be used to control the quantities of the air and steam entering the fuel processor 10 at 270 and 230.

Similarly, a flow control valve or other metering device can be used at juncture 310 to adjust the content of fuel reaching juncture 310 through fuel pipe 320 and mixing with the air/steam mixture reaching juncture 310 through pipe 300. In this manner, the optimum oxygen/fuel and steam/fuel ratios may be achieved and adjusted depending on the choice of catalysts used. Those skilled in the art will recognize that various methods are known that would allow for the preferred reactant mixture to be prepared from the separate heated steam, heated air, and fuel streams. The combined reactant mixture flows through reactant feed pipe 330 and out pipe 150, which preferably includes a nozzle, and into top part 32 of inner reforming zone 30 above perforated plate 160. Thus, as shown in FIG. 4, the combined reactants are added through the same pipe to the interior of fuel processor 10. The heated steam and air heat the fuel prior to introduction into fuel processor 10. In especially preferred embodiments, the temperature of the superheated steam and air leaving fuel processor 10 through steam and air outlets 180 and 280 prior to reaching juncture 190 ranges from about 430° C. to about 500° C. or more preferably from about 440° C. to about 480° C. In an embodiment using iso-octane as fuel, the liquid flow of iso-octane through pipe 150 was 21-30 mL/minute, the ambient air feed rate was from about 1.5 to about 2.4 scfm for the ambient air entering air inlet 270, and the water was fed at a 33-54 mL/min. An equivalent amount of steam may also be injected into pipe 230. No additional preheating of the fuel is required using fuel processor 10 although this may be accomplished if desired. Alternatively, it is possible that the reactants first mix inside fuel processor 10 and are added through separate pipes and inlets.

A spark from an ignition source 100 such as a spark plug or heated wire begins the partial oxidation reaction and immediately produces a drastic increase in the temperature. The gaseous mixture then flows through the perforation in perforated plate 160 and into the main chamber of inner reforming zone 30 as defined by side wall 34 where it contacts the catalysts. Heat released from the partial oxidation reaction is given off and drives the endothermic steam reforming reaction such that both partial oxidation and steam reforming occur in inner reforming zone 30. Because partial oxidation and steam reforming occur in the same reforming zone, the heat released from the partial oxidation reaction drives the steam reforming reaction reducing heat loss and increasing efficiency. Most preferably, the air to fuel and steam to fuel ratios are adjusted as previously described to adjust the temperature to one that is most favorable for the particular catalyst used. Sidewall 34 extends completely to the bottom of the fuel processor. However, gaps 36 allow the gaseous mixture exiting inner reforming zone 30 to enter outer reforming zone 40 which is defined by sidewall 34 of inner reforming zone 30 and the interior wall 84 of steam heating zone 80.

Because sidewall 34 separates inner reforming zone 30 and outer reforming zone 40, heat released by the partial oxidation reaction and not utilized in the steam reforming reaction is efficiently carried with the gases from inner reforming zone 30 to outer reforming zone 40 promoting further steam reforming on catalysts located in outer reforming zone 40. Preferably the same catalyst is used in both inner and outer reforming zones (30 and 40) so that both partial oxidation and steam reforming are conducted in at least two zones of fuel processor 10. However, it is possible to use a different catalyst or catalysts in inner and outer reforming zones 30 and 40. Heat generated in inner and outer reforming zones (30 and 40) heats the steam or water in steam heating zone 80 through interior wall 84 of steam heating zone 80. In this manner, water is vaporized and/or steam is superheated prior to entry into the fuel processor and the gaseous mixture exiting outer reforming zone 40, typically at a temperature ranging from about 600° C. to about 800° C. and more preferably at about 700° C., is cooled by effective heat transfer. It will immediately be apparent to those skilled in the art that the configuration of inner and outer reforming zones 30 and 40 and steam heating zone 80 may be modified to improve or modify heat transfer. For example, steam heating zone 80 may comprise a helical coil or finned structure.

As shown in FIG. 4, fuel processor 10 preferably comprises concentric cylinders, which make up the various zones in fuel processor 10. Thus, fuel processor 10 is configured so that heat generated in the middle of fuel processor 10 in inner reforming zone 30 is distributed outward in an efficient heat exchange system with increasingly cooler zones as the gaseous product mixture moves towards the exterior of fuel processor 10 and the sulfur removal zone 60 and water-gas-shift zone 70 which typically requires lower temperatures due to the reversible nature of the water-gas-shift reaction and the available catalysts.

Before entering sulfur removal zone 60, the reformate mixture leaving outer reforming zone 40 is preferably cooled by directly injecting water into cooling zone 50 through water coolant pipe 170. The water may be injected either as a liquid through a sparger or by first vaporizing it inside a coil and then injecting the steam or vapor through a sparger. In a particularly preferred embodiment, liquid water was added through a sparger tube at a rate of from about 5 to about 10 mL/min.

No liquid need be directly injected into fuel processor 10 to cool the reformate mixture after exiting outer reforming zone 40. Rather, or in combination with a direct injection, a coolant may be circulated through a pipe or other apparatus through cooling zone 50, which may be varied in size to match the cooling procedure used and the desired temperature. Preferably, the reformate mixture is cooled to a temperature that corresponds with a temperature range matching the operating temperature of the water-gas-shift catalyst in water-gas-shift zone 70. A particularly preferred temperature range of from about 180° C. to 440° C. or more preferably from about 200° C. to about 400° C. is maintained in water-gas shift zone 70.

After passing through cooling zone 50, the reformate gas preferably passes into sulfur removal zone 60 which reduces the level of sulfur compounds such as $H_2S$ in the reformate as described above. This is desirable because sulfur compounds react with most water-gas-shift catalysts to reduce the activity of such catalysts. Because the preferred catalysts used in the partial oxidation and steam reforming reaction in inner reforming zone 30 are sulfur tolerant, the fuel processor can be used with sulfur-containing fuels without prior sulfur removal pretreatment. Furthermore, because these catalysts are sulfur tolerant, lower temperatures may be used. These lower temperatures mean that most components of fuel processor 10 such inner reforming zone 30 and outer reforming zone 40 may be constructed of materials such as, but not limited to, stainless steel.

Finally, prior to exiting fuel processor 10 through reformate outlet 240, the reformate gas preferably passes through perforated plate 65 and then through water-gas-shift zone 70 where carbon monoxide and water react to form carbon dioxide and additional hydrogen. The reduction of carbon monoxide is desirable as carbon monoxide is known to react deleteriously with the anode of polymer electrolyte fuel cells. Air or another suitable $O_2$ rich gas flowing through air heating zone 90 from air inlet 270 to air outlet 280 is heated prior to introduction into inner reforming zone 30. The heating of the air simultaneously reduces the heat of the reformate as it passes through sulfur removal zone 60 and water-gas-shift zone 70. Preferred catalysts in water-gas-shift zone 70 include noble metals on ceria on alumina. These are formed by coating aluminum powder with ceria and then coating the noble metal on the ceria. Preferred noble metals include, but are not limited to platinum, ruthenium, palladium, and ruthenium. The reformate gas typically cools as it passes through water-gas-shift zone 70 such that water-gas-shift zone exhibits a decreasing temperature profile which has been found to be optimum for reducing the levels of carbon monoxide and for increasing the levels of $H_2$ in the reformate gas stream.

After passing out fuel cell 10 through reformate outlet 240, the reformate passes to the fuel cell through pipe 250. In a particularly preferred embodiment, the reformate exits fuel processor 10 through reformate outlet 240 at a temperature of about 200° C., and the temperature of the exterior housing 20 reaches a temperature of about 200° C. If a layer of insulation is used to surround exterior housing 20, the temperature of the exterior of the insulation typically reaches a temperature ranging from about 60° C. to about 100° C. Before being supplied to the fuel cell, however, it is preferred that the reformate be passed through further treatment apparatus such as a preferential oxidation unit (not shown) which may be used to preferably oxidize any remaining carbon monoxide to carbon dioxide without altering the amount of hydrogen in the gas stream. Conventional preferential oxidation units known to those skilled in the art may be used for such purpose.

A review of FIG. 4 illustrates that the invented fuel processor reduces heat loss by staging the components such that the hotter zones are surrounded by successively cooler zones. The various zones are arranged such that heat transfers from the exothermic zones to the endothermic zones are facilitated by placing them adjacent to one another or in the same zone in the case of the partial oxidation and steam reforming reactions. Additionally, steam heating and air heating zones (80 and 90) are arranged to reduce the heat of the reformate stream while heating these reactants prior to introduction into inner reforming zone 30. Countercurrent flow further optimizes the effectiveness of steam heating and air heating zones (80 and 90). These combined features allow desirable and optimal temperature profiles to be maintained by calculating the appropriate heat exchange (surface area, flows) that is needed. Additionally, the use of direct liquid injection achieves desired cooling in cooling zone 50 prior to the reformate entering the sulfur removal and water-gas-shift zones (60 and 70). The ability to add insulation materials allows further modification of the fuel processor. For example, insulation may be added to provide insulation between steam heating zone 80 and water-gas-shift zone 70 to reduce heating of the reformate and catalyst in water-gas-shift zone 70. Additionally, insulation may be added between outer reforming zone 40 and steam heating zone 80 and/or between inner reforming zone 30 and outer reforming zone 40.

Figure 5:
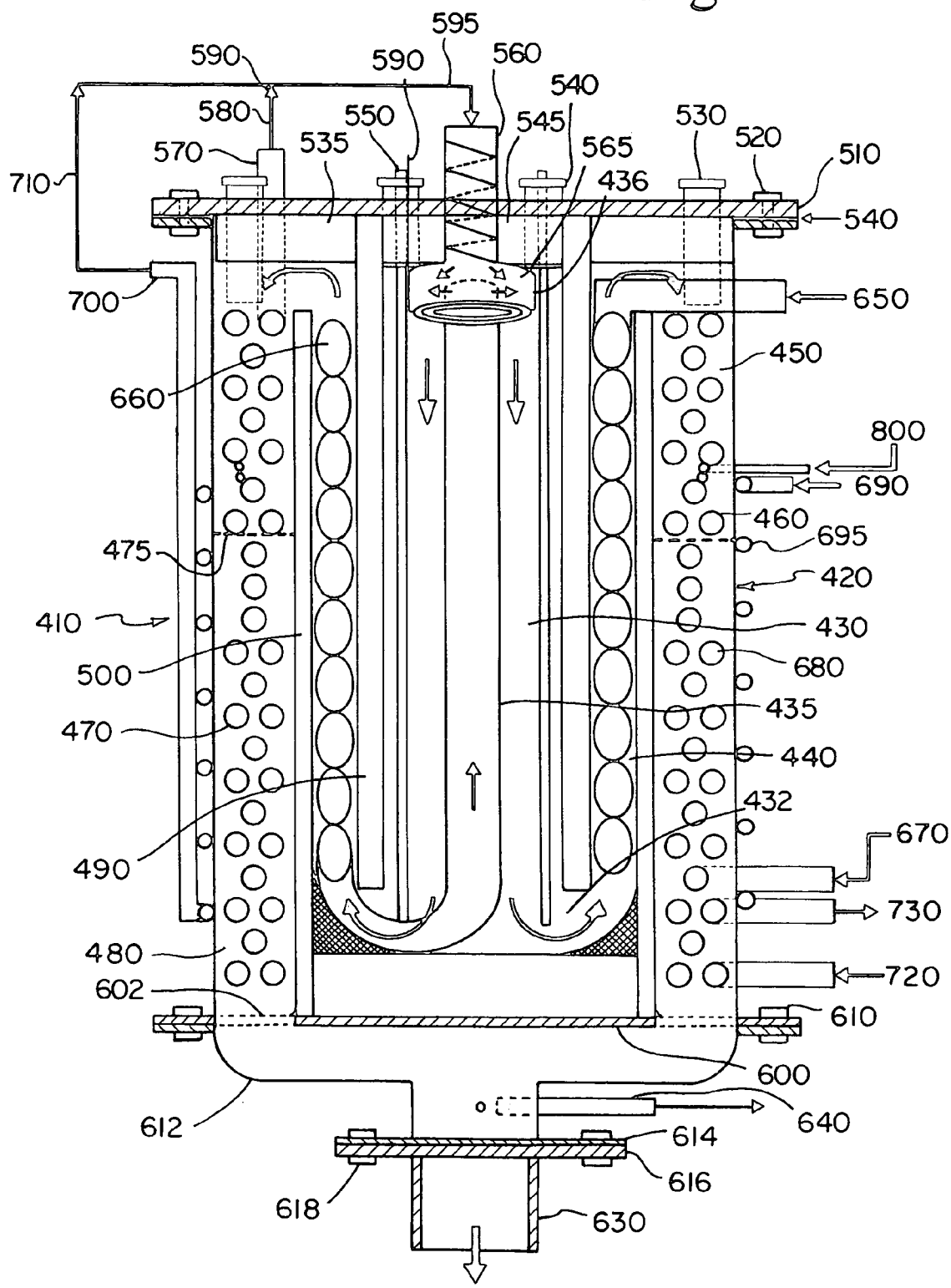
FIG. 5 is a cross sectional view of an alternative embodiment of a fuel processor according to the present invention.

A cross-sectional view of an alternative embodiment of a fuel processor for use in producing a hydrogen rich gas stream is shown generally in FIG. 5 where like numbers denote like elements. Fuel processor 410 includes an exterior housing 420 which is preferably, but not necessarily, cylindrical in shape. Fuel processor 410 includes an inner reforming zone 430 surrounding an air pipe 435 or inner tube inserted in or extending into a mixing nozzle 436, an outer reforming zone 440, a cooling zone 450, a sulfur removal zone 460, a first water-gas-shift zone 470 separated from sulfur removal zone 460 by a perforated plate 475; and a second water-gas shift zone 480. Inner reforming zone 430 is separated from outer reforming zone 440 by first sidewall 490, and second sidewall 500 separates outer reforming zone 440 from zones 450, 460, 470, and 480.

Inner reforming zone 430 contains a partial oxidation catalyst and a steam reforming catalyst or a catalyst that is useful in catalyzing both partial oxidation and steam reforming. Preferred such catalysts are those described above. Outer reforming zone 440 optionally, but preferably contains the same catalyst or catalysts used in inner reforming zone 430. However, it is not necessary for outer reforming zone to contain any partial oxidation catalyst or steam reforming catalyst. Both partial oxidation and steam reforming are accomplished in inner reforming zone 430 when the mixture of fuel oxygen, and steam contacts the catalysts after being introduced into inner reforming zone 430 through mixing nozzle 436. Sulfur removal zone 460 contains a material, which is known to remove sulfur compounds similar to that described with respect to FIG. 4. First and second water-gas-shift zones 470 and 480 contain a catalyst such as those described above for catalyzing the reaction of carbon monoxide and water to produce carbon dioxide and $H_2$. Although first and second water-gas-shift zones 470 and 480 may contain the same catalyst, preferably each contains a different water-gas-shift catalyst. More preferably first water gas-shift zone 470 comprises platinum on gadolinium doped ceria or platinum on ceria supported on aluminum, and second water-gas-shift zone 480 comprises CuZnO as a water-gas-shift catalyst.

A top plate 510 covers the top of fuel processor 410 and is secured with bolts 520 and uses a gasket 540 such as a graphite gasket to prevent leakage from the system. As shown in FIG. 5, pipes 530 typically pass through insulation 535 for loading sulfur removal material to sulfur removal zone 460. Pipe 560 allows heated steam and fuel to enter mixing nozzle 436 where these reaction components are mixed with air before entering inner reforming zone 430. Pipes 540 inserted through insulation 545 may be included in fuel processor 410 for loading catalysts into inner reforming zone 430. Thermocouples 550 are inserted through insulation 545 to allow reaction temperatures to be monitored. Furthermore, an ignition source such as a heated wire 590 is preferably inserted through insulation 545 to initiate the partial oxidation reaction in inner reforming zone 430. Preferably, top plate 510 further includes steam outlet pipe 570 which allows steam to flow out fuel processor 410 into pipe 580 to juncture 590 where it mixes with fuel and enters pipe 595 prior to entering pipe 560, inside which a static mixer 565 is preferably provided to enhance mixing of air, fuel, and steam inside mixing nozzle 436.

A bottom plate 600 with a perforated outer portion 602 below second water-gas shift zone 480 covers the bottom of fuel processor 410 and is secured with bolts 610 to lower exterior section 612 so that reformate gas may exit fuel processor 410 through perforations (not shown) in perforated outer portion 602 and enter into lower exterior section 612. After entering lower exterior section 612, reformate gas enters pipe 630 attached to lower exterior section 612 by flanges 614 and 616 secured with bolts 618. A sampling pipe 640 allows the composition of the reformate gas to be analyzed.

Air enters air inlet 650 and is heated as it proceeds through coils 660 in outer reforming zone 440 before reaching air pipe 435 where it is further heated before entering mixing nozzle 436. Steam or water enters steam inlet 670 and then passes through steam coils 680 cooling the reformate in zones 450, 460, and 470 and producing heated steam which flows out steam outlet pipe 570.

Fuel enters fuel inlet 690 and circulates through fuel heating coils 695 around the exterior of exterior housing 420 before exiting fuel outlet 700. After exiting fuel outlet 700, heated fuel enters fuel pipe 710 before reaching juncture 590 where it is combined with heated steam. It is not necessary that the fuel be heated. Furthermore, if desired, the fuel may be circulated through a pipe within fuel processor similar to that used for heating the water or steam.

As shown in FIG. 5, further cooling of second water-gas-shift zone 480 may be accomplished by supplying a coolant such as water into secondary water inlet 720, which then circulates through secondary water coils 725 before exiting secondary water outlet 730. This arrangement allows the temperature of second water-gas-shift zone 480 to be maintained at a different temperature from first water-gas-shift zone 470 which is preferred when different catalysts are used in these zones.

In operation, a mixture of heated steam and heated fuel are added to mixing nozzle 436 through pipe 560. Heated air reaches mixing nozzle 436 through air pipe 435. The mixture of air, steam, and fuel then flows through inner reforming chamber 430 before reaching gap 432 at the bottom of first sidewall 490. The reformate gas resulting from the partial oxidation and steam reforming processes in inner reforming zone 430 flows around gap 432 and into outer reforming zone 440 where further reforming occurs. Cooling occurs in outer reforming zone 440 and in cooling zone 450 as air circulates through air coils 660 in outer heating zone 440 and as water or steam circulates through steam coils 680 in cooling zone 450.

Before entering sulfur removal zone 460, the reformate mixture leaving cooling zone 450 preferably is cooled by water or steam introduced by pipe 800 through exterior wall 420 of fuel processor 410.

After passing through sulfur removal zone 460, the reformate passes through a perforated plate 475 and enters first water-gas-shift zone 470 where carbon monoxide and water are converted into carbon dioxide and $H_2$. Platinum on gadolinium doped ceria is a preferred catalyst in first water-gas-shift zone 470. After passing through second water-gas-shift zone 480, the reformate passes through perforated outer portion 602 and into lower exterior section 612 connected to pipe 630. As noted above, the reformate is then supplied to a fuel cell although it is preferably preferentially oxidized first.

Various insulation materials may be used in the fuel processor of the present invention. Such materials, include, but are not limited to, zirconia felt and other common insulating materials such as alumina, fiberfrax, silica, glass wool, and a vacuum.

As noted above, in preferred processes according to the invention, the reformate stream leaving the fuel processor is passed through a preferential oxidation unit that selectively oxidizes carbon monoxide to carbon dioxide. Generally, the preferential oxidation catalyst is a noble metal supported on aluminum. Preferred examples of preferential oxidation catalysts include, but are not limited to ruthenium on alumina, platinum on alumina, palladium on alumina, and rhodium on alumina.

It is understood that the present invention is not limited to the specific applications and embodiments illustrated and described herein, but embraces such modified forms thereof as come within the scope of the following claims.

What is claimed is:

1. A fuel processor for generating a $H_2$ rich gas from a fuel, comprising:
   (a) an inlet projecting through an exterior housing of the fuel processor attached to a steam line, an $O_2$ rich gas line, and a fuel line;
   (b) an inner reforming zone comprising a sidewall, a first end connected to the inlet, a partial oxidation catalyst and a steam reforming catalyst or a combined partial oxidation and steam reforming catalyst, and a second end;
   (c) an outer reforming zone comprising the sidewall of the inner reforming zone, an outer sidewall, a first end connected to the second end of the inner reforming zone, and a second end;
   (d) a cooling zone comprising a first end connected to the second end of the outer reforming zone and a second end;
   (e) a sulfur removal zone comprising a sulfur removal agent, a first end connected to the second end of the cooling zone, and a second end; and
   (f) a water-gas-shift zone comprising a catalyst that catalyzes the conversion of carbon monoxide and water to carbon dioxide and $H_2$, a first end connected to the second end of the sulfur removal zone, and a second end connected to an outlet of the fuel processor;

wherein the outer reforming zone further comprises a partial oxidation catalyst and a steam reforming catalyst or a combined partial oxidation and steam reforming catalyst; and wherein the fuel processor is configured to conduct simultaneously a partial oxidation reaction and a steam reforming reaction in the outer reforming zone.

2. The fuel processor of claim 1, wherein the cooling zone further comprises an injection tube that allows water to be directly injected into the cooling zone.

3. The fuel processor of claim 1, wherein the inner reforming zone comprises a combined partial oxidation and steam reforming catalyst comprising a transition metal and an oxide-ion conducting portion, further wherein the transition metal is selected from the group consisting of platinum, palladium, ruthenium, rhodium, iridium, iron, cobalt, nickel, copper, silver, gold, and combinations thereof, and the oxide-ion conducting portion is selected from the group consisting of ceramic oxides crystallizing in the fluorite structure, $LaGaO_3$, and mixtures thereof.

4. The fuel processor of claim 3, wherein the combined partial oxidation and steam reforming catalyst is platinum on gadolinium doped ceria.

5. The fuel processor of claim 1, wherein the sidewall of the inner reforming zone and the outer sidewall of the outer reforming zone are formed from stainless steel.

6. The fuel processor of claim 1, further comprising a steam heating zone disposed between at least a portion of the outer reforming zone and at least a portion of the water-gas-shift zone.

7. The fuel processor of claim 1, further comprising an air heating zone disposed between at least a portion of the water-gas shift zone and the exterior housing of the fuel processor.

8. The fuel processor of claim 1, wherein the sulfur-removal agent comprises zinc oxide.

9. The fuel processor of claim 1, wherein the catalyst in the water-gas-shift zone comprises a noble metal on ceria, wherein the noble metal is selected from the group consisting of ruthenium, rhodium, palladium, platinum, and combinations thereof.

10. A fuel processor for generating a $H_2$ rich gas from a fuel, comprising:
   (a) an inlet projecting through an exterior housing of the fuel processor into a mixing zone, the inlet attached to a steam line and a fuel line;
   (b) an inner reforming zone comprising a sidewall, a first end connected to the inlet, and a second end;

(c) an inner tube attached to an $O_2$ rich gas line and at least partially surrounded by the inner reforming zone;
(d) an outer reforming zone comprising the sidewall of the inner reforming zone, an outer sidewall, a first end connected to the second end of the inner reforming zone, and a second end;
(e) a cooling zone comprising a first end connected to the second end of the outer reforming zone and a second end;
(f) a sulfur removal zone comprising a first end connected to the second end of the cooling zone, and a second end; and
(g) a water-gas-shift zone comprising a first end connected to the second end of the sulfur removal zone, and a second end connected to an outlet of the fuel processor;
wherein the inner reforming zone further comprises a partial oxidation catalyst and a steam reforming catalyst or a combined partial oxidation and steam reforming catalyst; and wherein the fuel processor is configured to conduct simultaneously a partial oxidation reaction and a steam reforming reaction in the inner reforming zone.

11. The fuel processor of claim 10, wherein the water-gas-shift zone further comprises a first water-gas-shift zone and a separate second water-gas-shift zone, further wherein the first water-gas-shift zone comprises a first end connected to the second end of the sulfur removal zone and a second end, and further wherein the second water-gas-shift zone comprises a first end connected to the second end of the first water-gas-shift zone and a second end connected to the outlet of the fuel processor.

12. The fuel processor of claim 11, further comprising a cooling tube having an inlet and an outlet and extending through the second water-gas-shift zone.

13. The fuel processor of claim 11, wherein the inner tube extends into the mixing zone.

14. The fuel processor of claim 10, further comprising a steam inlet extending through the exterior housing of the fuel processor and connected to a pipe that extends through the fuel processor to a steam outlet, the steam outlet connected to a steam line that is connected to the inlet projecting through the exterior housing of the fuel processor into the mixing zone.

15. The fuel processor of claim 10, further comprising a fuel inlet connected to a fuel line that runs through the fuel processor or around the exterior housing of the fuel processor to a fuel outlet, wherein the fuel outlet is connected to a fuel line that is connected to the inlet projecting through the exterior housing of the fuel processor into the mixing zone.

16. The fuel processor of claim 11, wherein the cooling zone comprises a coiled coolant tube that extends through the cooling zone.

17. The fuel processor of claim 10, wherein the inner reforming zone comprises a combined partial oxidation and steam reforming catalyst, the combined partial oxidation and steam reforming catalyst comprising a transition metal and an oxide-ion conducting portion, wherein the transition metal is selected from the group consisting of platinum, palladium, ruthenium, rhodium, iridium, iron, cobalt, nickel, copper, silver, gold, and combinations thereof, and the oxide-ion conducting portion is selected from the group consisting of ceramic oxides crystallizing in the fluorite structure, $LaGaO_3$, and mixtures thereof.

18. The fuel processor of claim 17, wherein the combined partial oxidation and steam reforming catalyst comprises platinum on gadolinium doped ceria.

19. The fuel processor of claim 10, wherein the sidewall of the inner reforming zone and the outer sidewall of the outer reforming zone are formed of stainless steel.

* * * * *